(No Model.)  3 Sheets—Sheet 1.

C. J. A. SJOBERG.
MACHINE FOR STITCHING EYELETS.

No. 291,855. Patented Jan. 8, 1884.

Attest:
Sherman H. Hubbard
Wm. D. Bishop Jr.

Inventor:
Carl J. A. Sjöberg
By Attys.
Wooster Smith (No Model.)   3 Sheets—Sheet 2.

C. J. A. SJOBERG.
MACHINE FOR STITCHING EYELETS.

No. 291,855.   Patented Jan. 8, 1884.

Attest  
Therman H Hubbard  
Wm H Bishop Jr

Inventor;  
Carl J. A. Sjoberg  
By Attys.  
Wooster Smith (No Model.) 3 Sheets—Sheet 3.
C. J. A. SJOBERG.
MACHINE FOR STITCHING EYELETS.
No. 291,855. Patented Jan. 8, 1884.
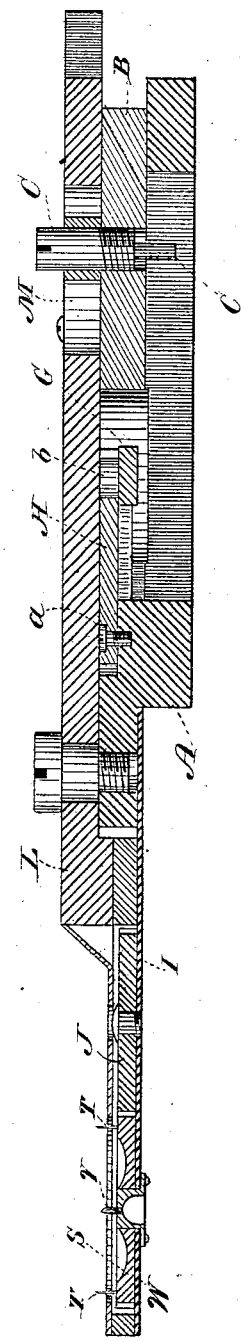
Witnesses:
Geo. T. Smallwood
A. M. Wooster
Inventor:
Carl J. A. Sjoberg.
By Wooster & Smith,
attys.

UNITED STATES PATENT OFFICE.

CARL J. A. SJOBERG, OF BRIDGEPORT, CONNECTICUT.

MACHINE FOR STITCHING EYELETS.

SPECIFICATION forming part of Letters Patent No. 291,855, dated January 8, 1884.

Application filed February 19, 1883. (No model.)

*To all whom it may concern:*

Be it known that I, CARL J. A. SJOBERG, a citizen of the United States, residing at Bridgeport, in the county of Fairfield and State of Connecticut, have invented certain new and useful Improvements in Machines for Stitching Eyelets; and I do hereby declare the following to be a full, clear, and exact description of the invention, such as will enable others skilled in the art to which it appertains to make and use the same.

My invention relates to machines for stitching eyelets, and has for its objects to concentrate the operating parts and simplify their manipulation, and also to protect the work from catching on the mechanism on the work-plate, and, furthermore, to hold the cloth or other work firmly and uniformly while the eyelet is being stitched; and with these ends in view my invention consists in certain details of construction and combination of elements, hereinafter fully and in detail explained, and then specifically designated by the claims.

In order that those skilled in the art to which my invention appertains may understand more fully how to make and use my improvement, I will proceed to describe the same in detail, referring by letters to the accompanying drawings, forming part of this specification, in which—

Figure 1:
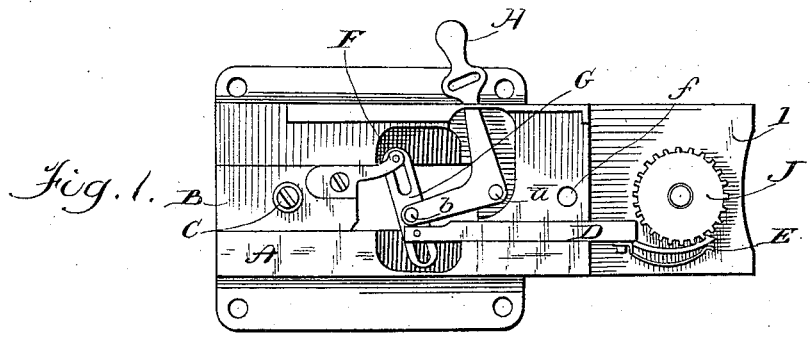
Figure 2:
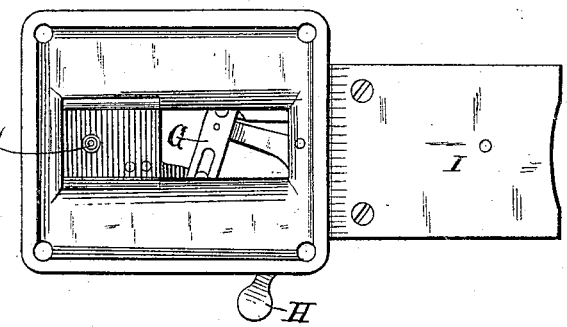
Figure 3:
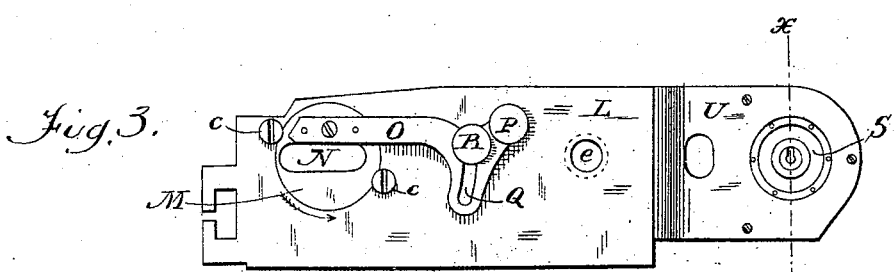
Figure 4:
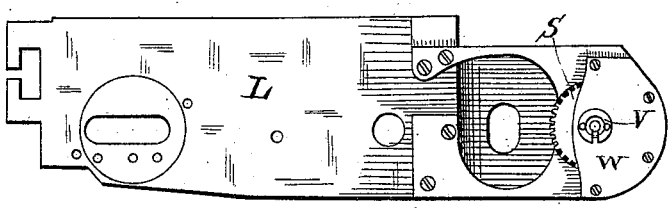
Figure 5:
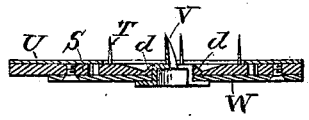
Figure 6:
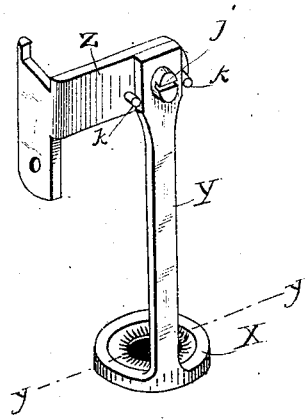
Figure 7:
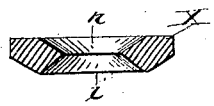
Figure 8:
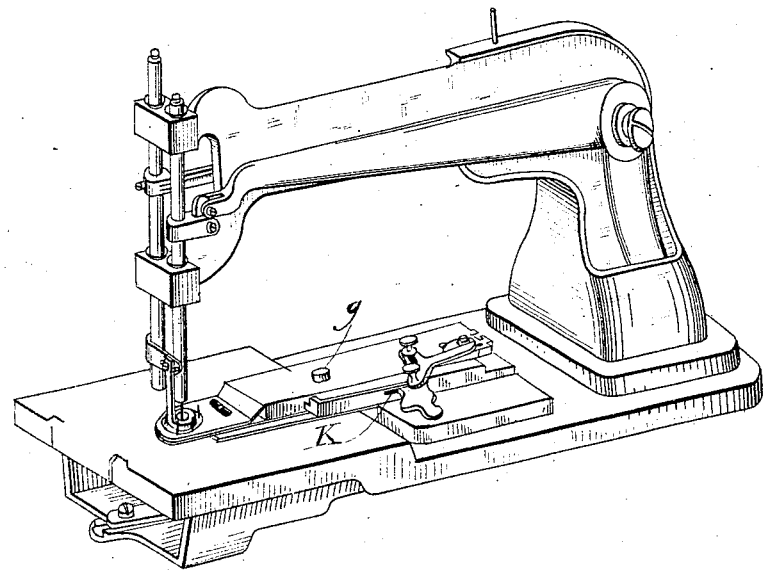

Figure 1 is a top or plan view of my improvement with the cap-piece removed; Fig. 2, a bottom view of the same; Fig. 3, a plan view of the cap-piece; Fig. 4, a bottom view of the same; Fig. 5, a section at the line $x\ x$ of Fig. 3; Fig. 6, a perspective of the presser-foot; Fig. 7, a section at the line $y\ y$ of Fig. 6; Fig. 8, a perspective showing my improvement attached to an ordinary sewing-machine, and Fig. 9 is a central vertical longitudinal section.

Similar letters denote like parts in the several figures.

A is the bed-plate of my device.

B is a plate arranged to slide within the bed-plate A, and having a pin, C, projecting above and below its plane.

D is a bar, which also slides in the bed-plate, and having at its forward extremity a spring-pawl, E.

At the forward end of the plate B, and secured thereto rigidly, is a lug, F, which projects from said plate, and is pivotally secured to a jog-link, G. The rear end of the bar D is similarly secured to said link. This link is constructed, as seen at Fig. 1, with a closed elongated opening at each end, and the lug F and bar D are secured to the extremities of said link by pins passed through said openings in such manner as to permit a free sliding movement, as will be presently explained.

H is a lever pivoted at $a$ to form a fulcrum, and with its inner extremities pivotally secured to the link G, as seen at $b$, Fig. 1.

I is a plate, which is fastened by screws or otherwise to the bed-plate, and secured to this plate I, in such manner as to rotate freely, is a toothed wheel, J. The spring-pawl E on the bar D operates upon this toothed wheel after the manner of a pawl and ratchet, as will be hereinafter fully set forth. In the side of the bed-plate is an opening, K, Fig. 8, for the play of the lever H.

Motion is imparted to my improved device by means of a switch-cam mounted on the shaft of the machine, the lower projection of the pin C being adapted to connect with the ordinary shoe or traveler in the switch-cam. As the shaft revolves, the plate B will slide in a direction at right angles to the line of movement of the shaft, thereby causing the link G to vibrate or jog and the bar D to slide, all of which will be readily understood by reference to Fig. 1.

It is obvious that the length of the slide of the bar D depends upon the distance between the pivotal point $b$ and the rear end of the said bar, which is adapted to slide in the link-opening, as hereinbefore set forth. When the bar is close to said pivotal point, the sweep or vibration of the link at the point where said bar is connected to the link-opening is at the minimum, and the slide at the bar D is thereby lessened, and the farther the pivotal point is removed from the bar the greater is the vibration of the link at the point above mentioned and the longer is the slide of the bar. The speed with which the wheel J turns at each complete revolution of the shaft of the machine depends upon the number of teeth traversed by the pawl E during that time, which of course is greater or less, according as the slide of the bar D is longer or shorter. In my device as at present constructed the pawl acts upon the wheel at intervals of seven teeth at the longest slide of the bar, and at the shortest slide at an interval of one tooth—that is to say, the revolution of the wheel is accomplished quicker in the former case than in the latter.

L is an oscillator or plate, and M an adjustable disk having a slot, N, therein, and a lever-arm, O, rigidly secured to said disk. This arm has a knob, P, for convenience in operating, and is adjustable by means of a slot, Q, and set-screw R. This disk M is set in the oscillator L and flush with the surface thereof, and is confined in such position by means of screws c c, inserted in said oscillator in such manner that their heads will lap over the periphery of the disk, all of which will be readily understood by reference to Fig. 3. By moving the lever-arm O in the direction indicated by the arrow near the disk M, the latter will rotate in said direction, and the slot N will become more and more deflected until the limit of adjustment of the lever-arm O is reached. By means of set-screw R, the lever may be held at any point of adjustment, all of which will be hereinafter fully explained.

At the forward end of the oscillator is a toothed carrier-wheel, S, having pins T projecting upward. This wheel is provided with an annular recess in its upper face, near the center, so as to give the latter a bellied appearance, as seen at d d, Fig. 5, for the purpose presently explained. Over this wheel is placed a plate, U, for the purpose of keeping the wheel from working out of position and preventing the thread or work from catching in the teeth of the wheel.

V is a spur, which is fastened to the plate W in such a manner as to project upward through the center of the carrier-wheel, as seen at Fig. 5. The cap or oscillator L is adapted to fit over the bed-plate A in such manner that the pin C will be inserted within the slot N, and the screw-hole e in said oscillator be in alignment with the screw-hole f in the bed-plate, and the two parts are then pivotally connected by a screw, g, as seen at Fig. 8. The location of the toothed wheel J on the bed-plate, and that of the carrier-wheel S in the oscillator, is such that when the two plates are connected as previously set forth, the teeth of the two wheels will mesh. As the shaft of the machine revolves, the pin C travels back and forth within the slot N. When the said slot is in a line parallel with the shaft, the oscillator L will not vibrate; but when the slot is deflected, as hereinbefore set forth, the action of the pin C within the slot will cause said oscillator to vibrate more or less, according to the degree of deflection, thereby causing a wider or narrow stitch in working the eyelet.

X is a presser-foot, made, as shown in cross-section at Fig. 7, with the ordinary upper bevel, h, and with the under side beveled, as seen at i, to correspond with and be adapted to the bellied portion d of the carrier-wheel S. Projecting upward from the presser-foot, and forming an integral part therewith, is a spindle, Y, which is pivoted to a frame, Z, as seen at j, and limited in its vibratory motion by two pins, k, situated in the frame at each side of the spindle and at a suitable distance therefrom. This frame Z is attached to the presser-bar of a sewing-machine, as seen at Fig. 8, so as to have a slight vibration.

In assembling the parts of my improved eyelet-stitching machine, I attach the oscillator or plate L to the bed-plate of the device, as hereinbefore shown and described. The carrier-wheel S may be secured in position either before or after these parts are attached. The device is then adapted to the bed-plate of a sewing-machine in such manner that the pin C, projecting from the under side of the plate A, will connect with a traveler or shoe in a switch-cam, as hereinbefore set forth.

The operation of my improvement is as follows: The eyelet-hole is placed over the spur V and the presser-foot X brought down upon the work, which causes the pins T to perforate the latter, thereby preventing its shifting. It will readily be understood that adaptation of the presser-foot to the carrier-wheel, as set forth, will draw the cloth or other material firmly and uniformly, so that there will be no gathering or cockling during the stitching, which is a great advantage. The slot N is deflected to the desired angle in order to regulate the width of stitch, and the lever H adjusted to determine the desired number of stitches around the eyelet.

Heretofore eyelet-machines have been constructed and various mechanisms devised for rotating the carrier-wheel step by step; but in the majority of these the feed mechanism has consisted of an intricate system of compound levers and jog-bars. This construction is of course very intricate and expensive, and at the same time incapable of being run at a high speed for any length of time without getting out of order.

The lever H may have a scale thereon, and an indicator-pin secured to the bed-plate and projecting through the lever, whereby the feed adjustment may be uniform.

I am aware that eyelet-machines have been constructed having a carrier-wheel with pins and actuated by a pawl and ratchet, and do not wish to be understood as laying claim to any such construction.

Having thus described my invention, what I claim as new, and desire to secure by Letters Patent, is—

1. In an eyelet-hole attachment or similar machine, the combination, with a jog-link and two sliding devices loosely connected therewith for actuating the feeding and oscillating mechanisms, of an adjustable lever to which said jog-link is pivoted, whereby the connections of said sliding devices relative to the pivotal point of the jog-link may be varied, substantially as set forth.

2. In an eyelet-hole attachment or similar machine, the combination, with the bed-plate, of a lever pivoted thereto, a jog-link pivoted to said lever, mechanism for operating said jog-link, a carrier-wheel for rotating the fabric, and connecting mechanism for imparting intermittent rotary motion to said carrier-wheel from said jog-link, substantially as set forth.

3. The combination, in an eyelet-hole or similar attachment for sewing-machines, of a carrier-wheel for rotating the fabric, an oscillating plate by which said wheel is carried, a sliding plate adapted to be reciprocated from the driving-shaft of the sewing-machine, and mechanism for imparting a vibratory movement to said oscillating plate and an intermittent rotary movement to said carrier-wheel from said sliding plate, substantially as shown and described.

4. In an eyelet-hole attachment for sewing-machines, the combination, with a bed-plate, of an oscillating plate pivoted thereto, a carrier-wheel arranged to rotate in said oscillating plate, a sliding device adapted to be reciprocated from the driving-shaft of the sewing-machine, mechanism for imparting vibratory movements to said oscillating plate and an intermittent rotary movement to said carrier-wheel from said sliding plate, and means for varying the movements of said oscillating plate and carrier-wheel, substantially as hereinbefore set forth and described.

5. The combination, with the oscillating plate L and slotted disk mounted therein, of means for adjusting the position of said slotted disk, substantially as set forth.

6. The combination, with the bed-plate A, of the lever H, pivoted to said bed-plate, a jog-link, G, pivoted to said lever, and thus adapted to be varied in its position thereby, the sliding bar or pawl-carrier D, loosely connected to said jog-link, the oscillating plate L, and mechanism for operating the said plate L and the jog-link, substantially as set forth.

7. In an eyelet or similar machine, the carrier-wheel S, having a raised central portion on its upper face, in combination with the presser-foot X, with its under surface beveled inward, whereby the fabric may be confined between the raised central portion and the inwardly-extending bevel, substantially as set forth and described.

8. The link G, pivoted, as shown, to the lever H, and adapted to slide at its extreme ends upon pins or projections attached to the lug F and bar D, substantially as set forth and described.

9. The sliding plate B, having lug F, in combination with the link G, lever H, and bar D, substantially as set forth.

10. The sliding plate B, in combination with the adjustable jog-link G and bar D, substantially as set forth.

11. The rotary disk M, having slot N, in combination with the lever O, having slot Q and set-screw R, substantially as described.

12. The combination, with the bed-plate A, the ratchet-wheel J, pivoted thereto, and the sliding pawl-carrier D, having the spring-pawl E, and adapted to reciprocate in suitable ways in said bed-plate, of the cap-plate I and the carrier-wheel S, adapted to rotate in said cap-plate, substantially as set forth.

In testimony whereof I affix my signature in presence of two witnesses.

CARL J. A. SJOBERG.

Witnesses:
SHERMAN H. HUBBARD,
WM. D. BISHOP, Jr.